(No Model.) 3 Sheets—Sheet 1.
J. CALDER.
FISHING REEL.
No. 360,758. Patented Apr. 5, 1887.
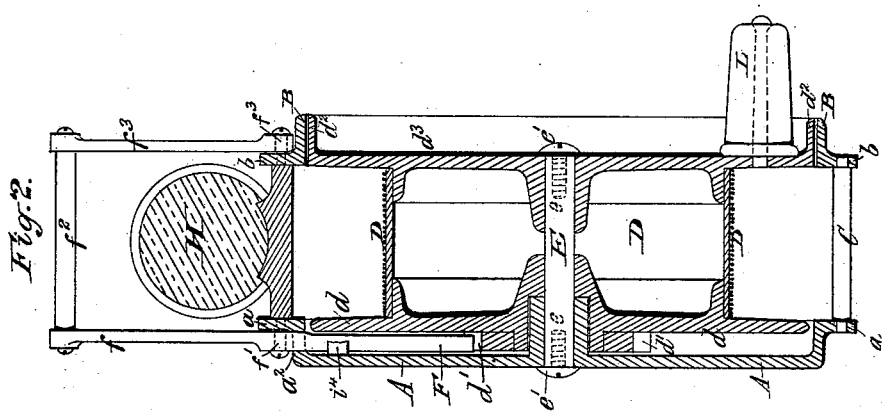
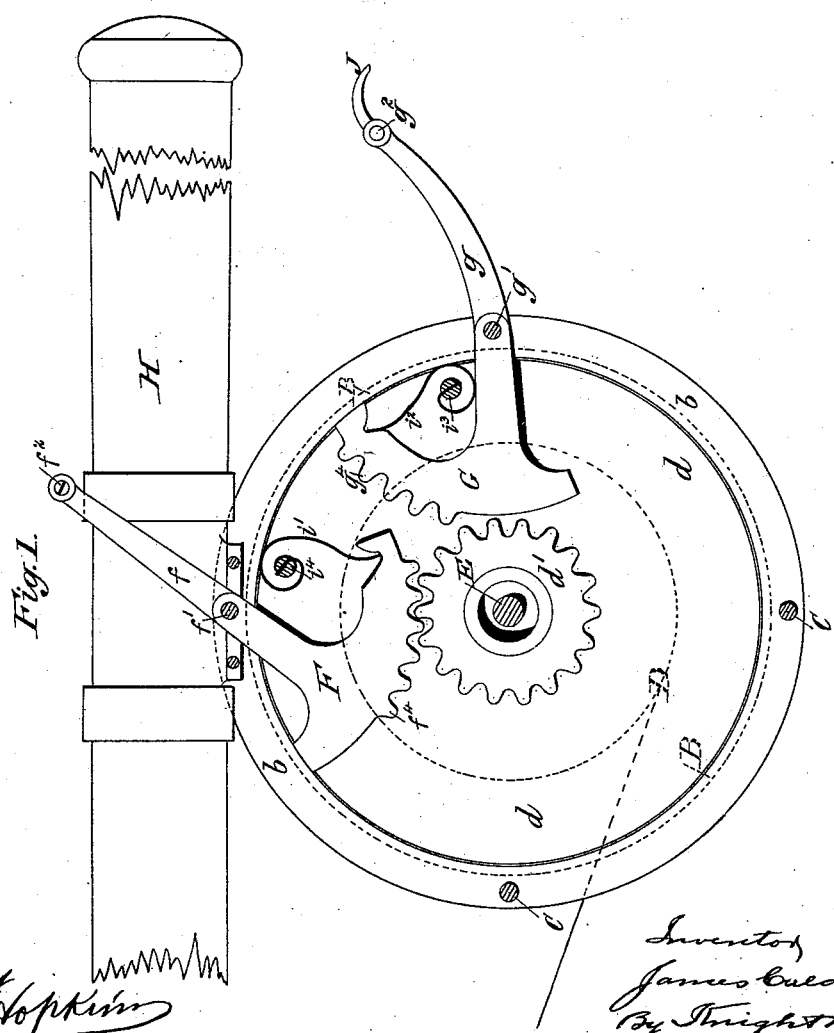

(No Model.) 3 Sheets—Sheet 2.
J. CALDER.
FISHING REEL.
No. 360,758. Patented Apr. 5, 1887.
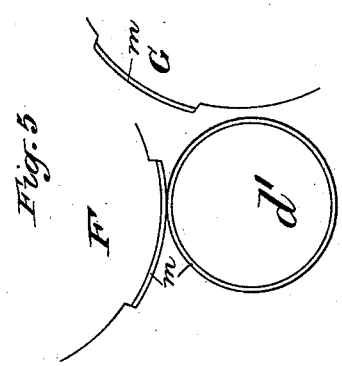
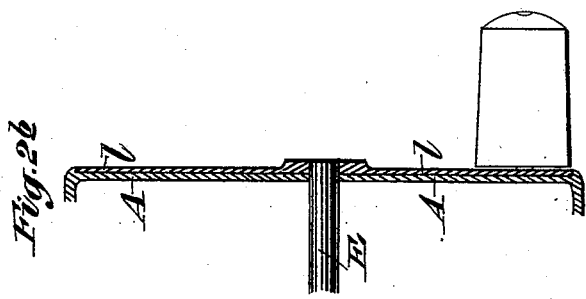
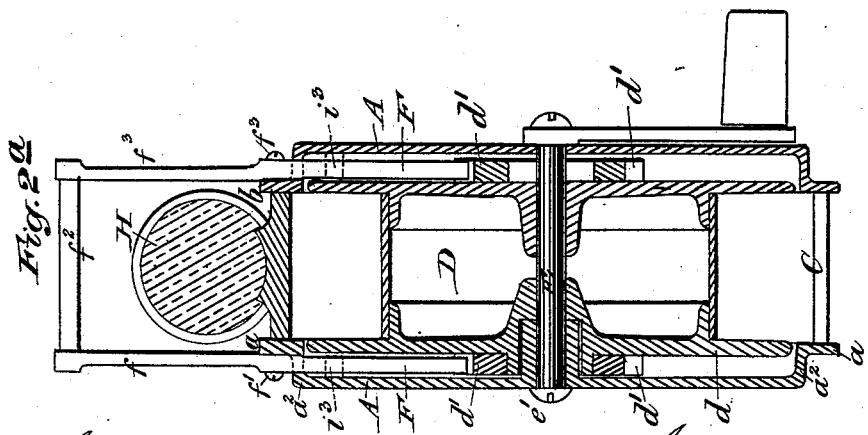

(No Model.) 3 Sheets—Sheet 3.
J. CALDER.
FISHING REEL.
No. 360,758. Patented Apr. 5, 1887.
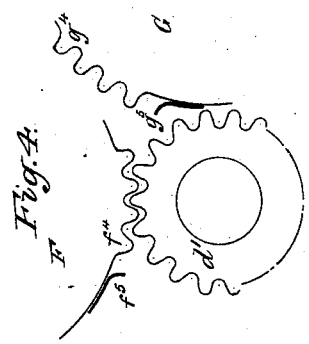
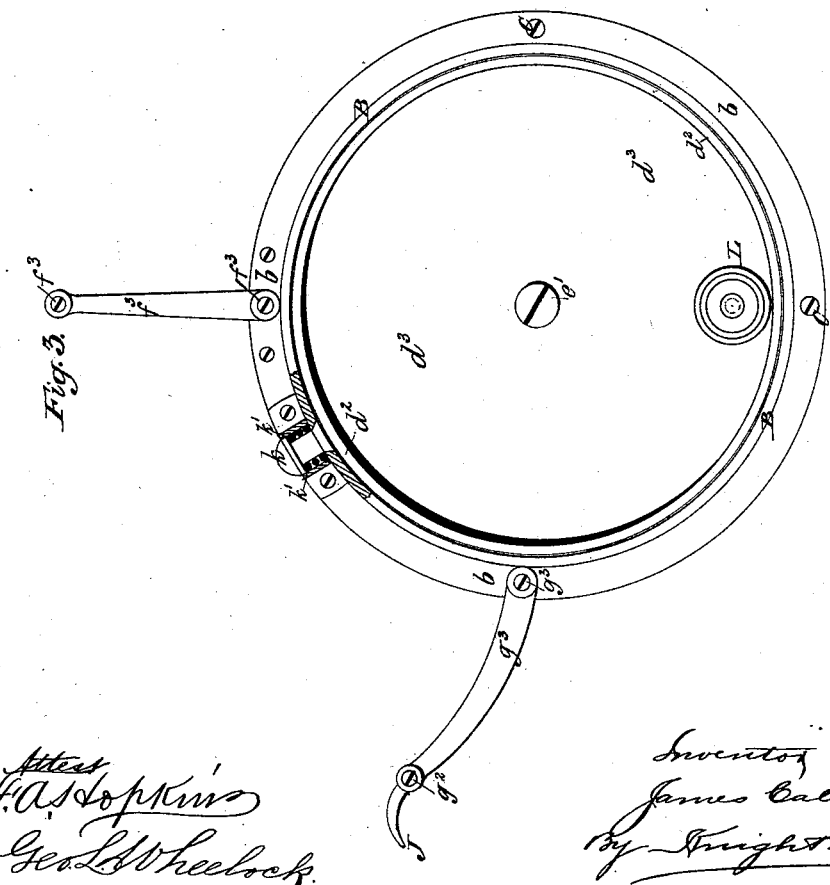
Attest
F. A. Hopkins
Geo. L. Wheelock
Inventor
James Calder
By Knight Bros
Attys

UNITED STATES PATENT OFFICE.

JAMES CALDER, OF DUNDEE, COUNTY OF FORFAR, SCOTLAND.

FISHING-REEL.

SPECIFICATION forming part of Letters Patent No. 360,758, dated April 5, 1887.

Application filed September 1, 1885. Serial No. 175,903. (No model.) Patented in England August 8, 1885, No. 9,471; in France August 17, 1885, No. 170,637; in Belgium August 19, 1885, No. 69,934; in Germany August 19, 1885, No. 34,645; in Canada September 23, 1885, No. 22,521; in Austria-Hungary November 28, 1885, No. 33,123, and in Norway December 31, 1885.

*To all whom it may concern:*

Be it known that I, JAMES CALDER, of 7 Ellen Street, Dundee, in the county of Forfar, Scotland, gentleman, have invented Improvements in Fishing-Reels, (for which I have obtained patents in foreign countries as follows, to wit: England, August 8, 1885, No. 9,471; France, August 17, 1885, No. 170,637; Belgium, August 19, 1885, No. 69,934; Germany, August 19, 1885, No. 34,645; Canada, September 23, 1885, No. 22,521; Austria, November 28, 1885, No. 33,123; and Norway, December 31, 1885,) of which the following is a specification.

This invention, which relates to improvements in fishing-reels, has reference more particularly to mechanism for throwing off and winding up the line. This is effected by the employment of two ratchet levers or arms, one, the upper lever, being operated by the thumb of the hand grasping the butt of the rod, the other or lower arm being operated by the forefinger, it being understood that the reel is attached to the under part of the butt in the usual manner. Both arms have their lower extremities formed with toothed segments, which are capable of engaging and disengaging with a pinion common to both, the said pinion being fixed to or formed upon the axis of the winding-drum at one side thereof. Both arms are operated under the influence of springs, and are so mounted, in combination with the pinion of the winding-drum, as to impart a motion of rapid rotation thereto in different directions, so as to enable a length of line to be thrown off or drawn in instantly by the movement of the thumb or forefinger of the hand grasping the butt of the rod.

In the drawings, Figure 1 is a side elevation of the reel with the outer disk or plate of the framing removed in order to show the arrangement of the two ratchet-arms and the pinion more clearly. Fig. 2 is a transverse vertical section of the reel. Figs. 2$^a$ and 2$^b$ are modifications, hereinafter referred to. Fig. 3 is a side elevation of the right-hand side of the reel, or that side upon which is usually placed the winding-handle. Fig. 4 is a detailed view of parts of my improvements. Fig. 5 is a modification showing the friction instead of toothed gearing.

The frame carrying the winding drum or wheel consists of a disk or frame plate, A, recessed on its inner face, its periphery being formed with a flange, $a$. The said disk has opposite to it a flanged ring, B, which is connected to the disk A by distance pieces or pins C, the drum D being mounted between the two parts A and B and revolving upon the spindle E, which is itself capable of revolving freely through the center of the reel. To the side of the disk $d$ of the winding-drum is fixed the pinion $d'$, which lies between the frame-plate A and the said disk. In gear with the said pinion are the two toothed segments F G. The said segments are formed upon the lower extremities of the arms $f\, g$, which pass through the rim $a^2$ of the plate A, and are pivoted upon the studs or pins $f'\, g'$, fixed to the flange $a$ of the said plate A. The arms $f$ and $g$ are prolonged outside of the reel, the arm $f$ being brought above the top of the butt H of the rod, and the arm $g$ being in a position below the butt, as shown in Fig. 1. The said arms are bridled or connected by the cross-bars $f^2\, g^2$, respectively, to arms pivoted upon the flange $b$ of the opposite ring B, as shown at $f^3\, g^3$, the butt H passing through the pivoted parts of the arm $f$, as shown in Figs. 1 and 2, the effect of this arrangement being that a free or parallel motion is given to the ratchet-arms when the cross-bars $f^2\, g^2$ are pressed in their required direction by the thumb or forefinger.

The ratchet-arms $f\, g$ are of a suitable length and form to be operated by the thumb or forefinger of the hand grasping the butt H of the rod, and are so arranged under the influence of the springs $i'\, i^2$, which are fixed to the frame-plate A at the inner side thereof by the pins $i^3\, i^4$, that when the arm $f$ is pressed down against the power of the spring $i'$ toward the butt H out of its vertical position the teeth $f^4$ of the segment F are thrown in gear with the teeth of the pinion $d'$ of the winding-drum D and the parts moved to the position shown in Fig. 1.

It will be observed that in depressing the operating-lever $f$ the drum D will be turned in the direction for "hauling-in;" but as the teeth of the segment $f^4$ do not pass beyond the teeth of the pinion $d'$, but remain in engagement therewith when the operating-lever is in its lowermost position, the movement of the said drum is proportional to the movement of the lever—that is to say, the said drum will not be set in motion by the depression of the lever $f$, and allowed to continue in motion by reason of the momentum acquired thereby; but its movement will be positive and continue only while the said lever is being depressed. The operating-lever is held in this depressed position until it shall be desired to pay out the line, whereupon, releasing it, the spring $i'$ causes the said arm to return with a recoil, and in so doing impart a motion of rapid rotation to the pinion and the drum or wheel D, to which it is attached, and thus causing a length of line to be thrown off from the reel. The arm $g$, when pulled up from the position shown in Fig. 1 toward the butt and against the spring $i^2$ by the forefinger of the hand grasping the butt, brings the teeth $g^4$ of the segment G in a similar manner in gear with the pinion $d$, and on the said arm being released the spring $i^2$ causes the arm to return with a recoil in a similar manner to the arm $f$, and in so returning to impart a reverse motion of rapid rotation to the pinion, and so cause a length of line to be instantly wound upon the reel. The cross-bar $g^2$ of the lever $g$ is formed with a trigger, J, for the purpose of conveniently operating the said arm by the forefinger of the hand grasping the butt. In lieu of two levers or arms, as hereinbefore described, for giving two different motions to the winding-drum, one lever only, in combination with the pinion, may be employed when a motion in one direction only is found sufficient; or, in other words, either the lever $f$ and segment F, or the lever $g$ and segment G, may be dispensed with, accordingly as it is desired not to wind up or pay out the line by such mechanism.

Upon the edge of the ring B, which forms part of the frame-work, is a spring-brake, $k$, to act on the flange $d^2$, provided on the disk $d^3$ of the drum D, for the purpose of arresting and regulating its motion, the said brake consisting of a button, $k$, capable of being pressed against the flange $d^2$ of the drum under the action of a spiral or other spring, $k'$.

The spindle E, carrying the winding drum or wheel D, is preferably, and as shown in Fig. 2, mounted free to rotate through the reel, its extremities being provided with screwed pins $e$, formed with flanged heads $e'$, to keep the spindle secure.

For winding or unwinding the line in the ordinary way when necessary, a handle, L, is fixed to the outer drum-disk, $d^3$, toward the edge thereof, as shown in Figs. 2 and 3.

In lieu of a button to be pressed against the edge of the drum, as described, I may use a brake constructed in combination with the ratchet-arms $f\ g$, the said brake, as shown in Fig. 4, consisting in the employment of a piece of flexible steel or other suitable material, $f^5\ g^5$, to take the place of the first tooth of the segments F G in Fig. 1, the said strips of steel being so arranged as to bear with frictional contact against the teeth of the pinion by a motion of the arms when the said arms are in their normal position or the position of the arm $g$ in Fig. 1.

In lieu of the employment of teeth for the ratchets and pinion, the said parts may be geared together by frictional contact by means of india-rubber or similar material applied to their surfaces, as shown in Fig. 5, the india-rubber being shown at $m$. With either teeth or rubber gearing the strength of "throw off" or "wind in" may be regulated by the extent of the arc described by the levers.

My improvements can be worked equally as well when using the rod either right or left handed, and all the actions and motions can be made without changing hands, and still grasping the rod with both hands.

Although the winding drum or wheel is arranged to revolve upon a revolving pin, the mechanism constituting the essential features of my invention can be equally well applied to reels of the ordinary construction, such as the reels shown in Figs. 2$^a$ and 2$^b$. The throwing off and winding in mechanism can also be applied to both sides of the reel. Such a modification is shown in Fig. 2$^a$, in which the drum D is fixed or keyed upon the spindle E, and the winding-handle is also keyed upon the spindle, or the winding-handle may operate the spindle by means of the disk $l$, keyed upon the spindle, as in Fig. 2$^b$.

I am aware that it has been proposed to impart rotation to a "gaming-wheel" by means of a spring acting through the medium of a segmental rack pivoted to the frame, and a pinion upon said wheel, with which said rack engages in a manner substantially the same as that in which my improved reel is actuated, and do not claim, broadly, any features which my said device possesses in common therewith.

I am also aware that it is not broadly new to apply a spring braking device to a fishing-line reel for regulating its rotation.

I claim—

1. In a fishing-reel, the combination, with a winding-drum having a gear-wheel secured thereto, and an operating-lever having a segmental gearing-surface for engaging therewith, of a spring-plate secured to said lever for braking the motion of the drum, as set forth.

2. The combination of the fishing-rod H, the frame secured thereto, the drum D, journaled in said frame and having the gear-wheel $d'$, the operating-lever having a segmental gearing-surface engaging with the wheel $d'$, and the fishing-line, all arranged to operate substantially as set forth.

3. The combination of the fishing-rod H, the frame secured thereto, the drum D, journaled in said frame, and having the gear-wheel $d'$, the operating-lever having a segmental gearing-surface for engaging said wheel $d'$ when depressed, a spring for imparting a rapid movement to said segmental gear, and consequently to the wheel $d'$ and drum D when pressure upon said lever is removed, and the fishing-line, all constructed and arranged to operate substantially as set forth.

4. In a fishing-reel, the combination, with the frame, and the drum D, journaled therein, and having the gear-wheel $d'$, of the two operating-levers $f$ $g$, having oppositely-engaging segmental gears F and G, respectively, and the springs for holding both of said gears normally out of engagement with the wheel $d'$, for the purpose set forth.

5. The combination, with the butt H, the frame secured thereto, the drum D, journaled in said frame, and the gear-wheel $d'$, secured to said drum, of the pivoted operating-lever $f$, crossing said butt, terminating at one end above it, and having at the other the segmental gear F, the pivoted operating-lever $g$, terminating beneath the said butt, and having at the other the segmental gear G, and springs for holding said gears normally out of engagement with the wheel $d'$, for the purpose set forth.

6. The combination of the butt H, the frame secured to one side thereof, the drum D, journaled in said frame and having the flanges $d$ and gear-wheel $d'$, the lever $f$, pivoted to the frame and extending across the butt, the segmental gear F, carried by said lever, the lever $g$, pivoted to the frame and terminating on the under side of the butt, the segmental gear G, carried by said lever, the springs for moving said segments in opposite directions and holding both normally out of engagement, and the line, all constructed and arranged to operate substantially as set forth.

7. The combination, with the butt H and a reel secured to one side thereof, of a pair of oppositely-engaging operating-levers for moving said reel in opposite directions, said levers terminating on the respective sides of the said butt, and springs for holding said levers normally out of engagement with the drum, as set forth.

In testimony whereof I have signed my name to this specification in the presence of two subscribing witnesses.

JAMES CALDER.

Witnesses:
J. Y. JOHNSON,
JOHN LIDDLE,
*Both of* 115 *St. Vincent Street, Glasgow.*